(12) United States Patent
Lin

(10) Patent No.: US 8,006,611 B2
(45) Date of Patent: Aug. 30, 2011

(54) WATER FEEDING DEVICE OF HOT DRINK MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 356 days.

(21) Appl. No.: 12/427,798

(22) Filed: Apr. 22, 2009

(65) Prior Publication Data

US 2010/0269703 A1    Oct. 28, 2010

(51) Int. Cl.
*A23F 3/00* (2006.01)

(52) U.S. Cl. ............................................ 99/281; 99/283

(58) Field of Classification Search ............ 99/280–283, 99/302 R, 307
See application file for complete search history.

(56) References Cited

U.S. PATENT DOCUMENTS

| | | | | | |
|---|---|---|---|---|---|
| 3,795,788 | A | * | 3/1974 | Perucca | 99/281 |
| 5,440,972 | A | * | 8/1995 | English | 99/282 |
| 6,142,063 | A | * | 11/2000 | Beaulieu et al. | 99/283 |
| 2005/0051033 | A1 | * | 3/2005 | Lassota | 99/283 |
| 2006/0096465 | A1 | * | 5/2006 | Hu et al. | 99/280 |
| 2008/0264264 | A1 | * | 10/2008 | Morgandi | 99/281 |
| 2008/0307975 | A1 | * | 12/2008 | Kodden et al. | 99/280 |

* cited by examiner

*Primary Examiner* — Steven Wong
(74) *Attorney, Agent, or Firm* — Alan Kamrath; Kamrath & Associates PA

(57) ABSTRACT

A water feeding device of a hot drink maker, particularly of a coffeemaker, is provided wherein a water feeding operation and a water heating time are controlled by a water temperature sensor, a computer circuit board, and a motor, all of which are installed in the hot drink maker. The motor is driven according to a sensing result obtained by sensing water temperature at a predetermined position, so as to push heated water smoothly and completely into an inlet of a brewing chamber. Thus, ground coffee in the brewing chamber is infused by the liquid-state heated water of a predetermined temperature to make a hot drink with a desirable taste.

3 Claims, 4 Drawing Sheets

WATER FEEDING DEVICE OF HOT DRINK MAKER

BACKGROUND OF THE INVENTION

1. Technical Field

The present invention relates to a water feeding device of a hot drink maker, particularly of a coffeemaker, wherein a water feeding operation and a water heating time are controlled by a water temperature sensor, a computer circuit board, and a motor, all of which are installed in the hot drink maker. The motor is driven according to a sensing result obtained by sensing water temperature at a predetermined position, so as to push heated water smoothly and completely into an inlet of a brewing chamber. Consequently, ground coffee in the brewing chamber is infused by the liquid-state heated water of a predetermined temperature to make a hot drink with a desirable taste.

2. Description of Related Art

Nowadays, heating devices for making various hot drinks are available in a variety of configurations. For example, a conventional hot drink maker 90 for infusing ground coffee is shown in FIG. 1. The hot drink maker 90 is provided with a water tank 10 for holding tap water. A water pipe 20 extending from a bottom of the water tank 10 is coupled to a cylindrical inner receptacle 40 wound exteriorly with an electric heating tube 50. In addition, a flow meter 30 for controlling the amount of water required each time for making a desired hot drink is installed at the water pipe 20 between the water tank 10 and the cylindrical inner receptacle 40. The cylindrical inner receptacle 40 has a water outlet end coupled via another water pipe 20 to a showerhead-type water outlet 201 above an inlet of a brewing chamber 70. The latter water pipe 20 has an end located adjacent to the showerhead-type water outlet 201 and provided with a gate 60 for allowing or blocking passage of hot boiled water. Besides, a container 80 is placed below the brewing chamber 70 for receiving brewed coffee therefrom. Thus, in order to infuse ground coffee, the required amount of water is introduced from the water tank 10 through the flow meter 30 into the cylindrical inner receptacle 40 so as to be heated to a boil by the electric heating tube 50 wound exteriorly around the cylindrical inner receptacle 40. Then, vapor from the boiling water passes through the opened gate 60 and comes out from the showerhead-type water outlet 201, thereby infusing the ground coffee in the brewing chamber 70.

However, the aforementioned hot drink maker has the following drawbacks when used to infuse ground coffee:

1. The water in the cylindrical inner receptacle is heated by the electric heating tube wound therearound so that it difficult to boil and evaporate all the water, and in consequence some of the water tends to remain in the inner receptacle. Besides, the vapor rising from the boiling water may condense into water drops and be blocked by the gate.

2. Since the ground coffee in the brewing chamber is infused by the vapor of the boiling water in the cylindrical inner receptacle, the typical flavor of coffee is easily damaged by the overly high temperature of the vapor so that the resultant coffee tastes less than desired.

BRIEF SUMMARY OF THE INVENTION

The present invention provides an improvement over the water feeding and heating assembly of the conventional hot drink maker for infusing ground coffee so that the hot drink maker is installed with a water temperature sensor for sensing water temperature at a predetermined position, a computer circuit board, and a motor driven according to a sensing result so as to push heated water smoothly and completely into an inlet of a brewing chamber. Thus, ground coffee in the brewing chamber is infused by the liquid-state heated water of a predetermined temperature to make a tasty hot drink.

A first objective of the present invention is to provide a water feeding device of a hot drink maker designed for infusing ground coffee, wherein the water feeding device is configured as follows. A water tank of the hot drink maker has an end installed with a water temperature sensor. A computer circuit board is installed at a predetermined position of the hot drink maker. A water pipe extending from a bottom of the water tank is coupled to a showerhead-type water outlet above a brewing chamber and formed with a tubular inner receptacle having a plurality of turns. The tubular inner receptacle has an inner periphery installed with an electric heating tube that extends in accordance with the tubular inner receptacle. In addition, a motor is installed at a section of the water pipe between the water tank and the tubular inner receptacle. When the hot drink make assembled from the aforesaid components is used to infuse ground coffee, the water temperature sensor senses a water temperature in the water tank and sends a sensing result to the computer circuit board where the sensing result is converted into a delay time by which the motor is to be delayed from being started to push out heated water. Tap water in the water tank flows by itself into the tubular inner receptacle and is heated by the electric heating tube to a predetermined temperature. Then the motor, after being delayed by the previously set delay time, pushes the heated water smoothly and completely into an inlet of the brewing chamber so that ground coffee in the brewing chamber is infused by the liquid-state heated water of the predetermined temperature to make a hot drink with a desirable taste.

A second objective of the present invention is to provide a water feeding device of a hot drink maker designed for infusing ground coffee, wherein the water feeding device is configured as follows. A water tank of the hot drink maker has a bottom extended with a water pipe formed with a tubular inner receptacle having a plurality of turns. A water temperature sensor is installed adjacent to a water outlet of tubular inner receptacle. A computer circuit board is installed at a predetermined position of the hot drink maker. An electric heating tube is installed at an inner periphery of and extends in accordance with the tubular inner receptacle. Additionally, a motor is installed at a section of the water pipe between the water tank and the tubular inner receptacle. When the hot drink make assembled from the aforesaid components is used to infuse ground coffee, the water temperature sensor senses a water temperature of water heated in the tubular inner receptacle and sends a sensing result to the computer circuit board, which converts the sensing result into a delay time by which the motor is to be delayed from being started to push out the heated water. On the other hand, tap water in the water tank flows by itself into the tubular inner receptacle so as to be heated by the electric heating tube to a predetermined temperature and, after the motor is delayed by the previously set delay time, is pushed by the motor into an inlet of the brewing chamber smoothly and completely. Thus, ground coffee in the brewing chamber is infused by the liquid-state heated water of the predetermined temperature to make a hot drink with a desirable taste.

A third objective of the present invention is to provide a water feeding device of a hot drink maker designed for infusing ground coffee, wherein the water feeding device is configured as follows. A water tank of the hot drink maker has a bottom extended with a water pipe. A showerhead-type water outlet is coupled with a distal end of the water pipe while a water temperature sensor is installed adjacent to the distal end of the water pipe. A computer circuit board is installed at a predetermined position of the hot drink maker. The water pipe extending from the bottom of the water tank is formed with a tubular inner receptacle having a plurality of turns. An electric heating tube is installed at an inner periphery of and extends in accordance with the tubular inner receptacle. Finally, a motor is installed at a section of the water pipe between the water tank and the tubular inner receptacle. When the hot drink make assembled from the aforesaid components is used to infuse ground coffee, the water temperature sensor senses a water temperature of water inside a section of the water pipe adjacent to the showerhead-type water outlet and sends a sensing result to the computer circuit board so that the sensing result is converted into a delay time by which the motor is to be delayed from being started to push out the heated water. On the other hand, tap water in the water tank flows by itself into the tubular inner receptacle so as to be heated by the electric heating tube to a predetermined temperature and then, after the motor is delayed by the previously set delay time, is pushed by the motor smoothly and completely into an inlet of the brewing chamber. Thus, ground coffee in the brewing chamber is infused by the liquid-state heated water of the predetermined temperature to make a hot drink with a desirable taste.

BRIEF DESCRIPTION OF THE SEVERAL VIEWS OF THE DRAWINGS

The invention as well as a preferred mode of use, further objectives, and advantages thereof will be best understood by referring to the following detailed description of illustrative embodiments in conjunction with the accompanying drawings, wherein.

DETAILED DESCRIPTION OF THE INVENTION

Figure 1:
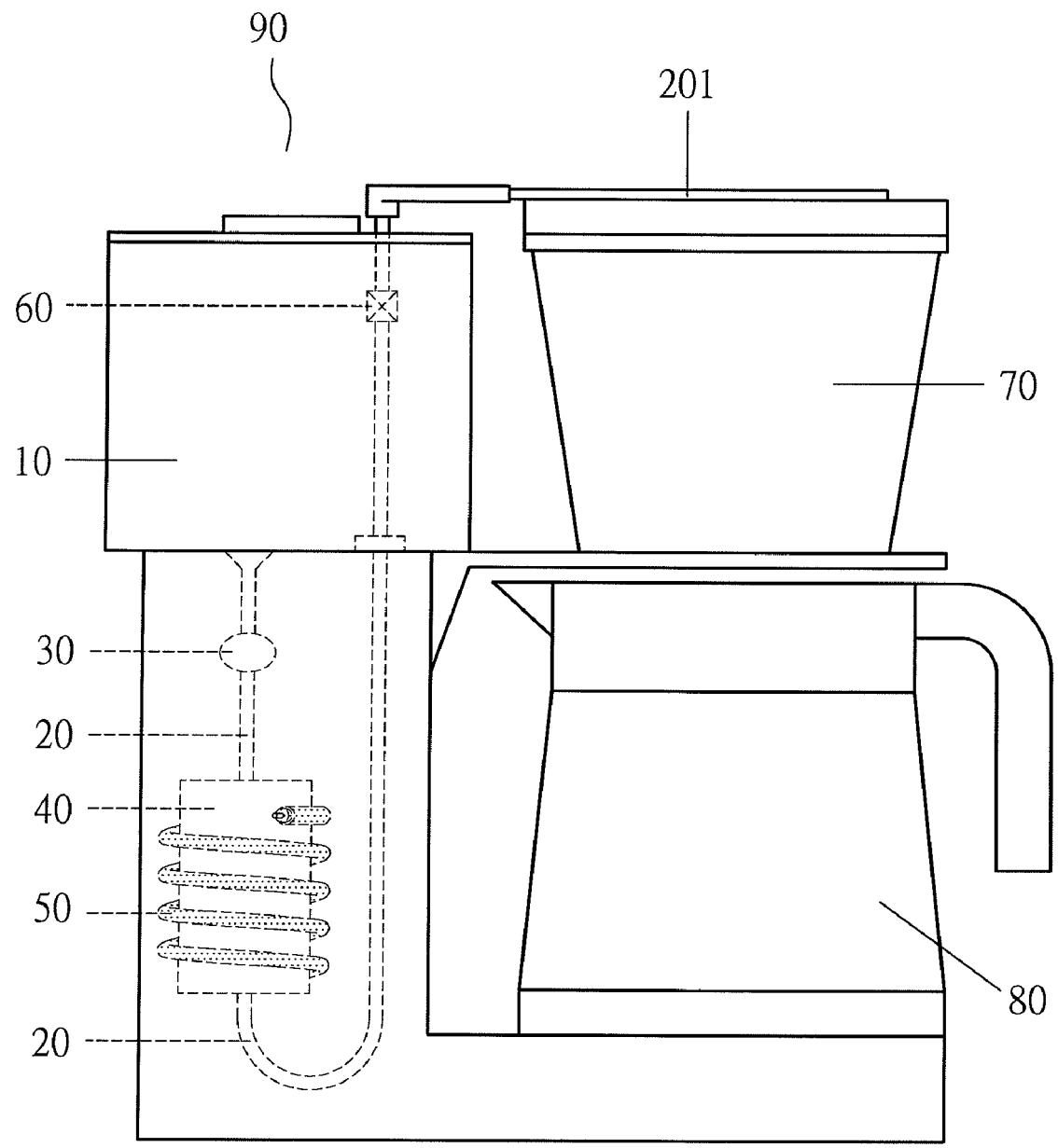
FIG. 1 is a schematic drawing showing the location of a water feeding and heating device of a conventional hot drink maker.
Figure 2:
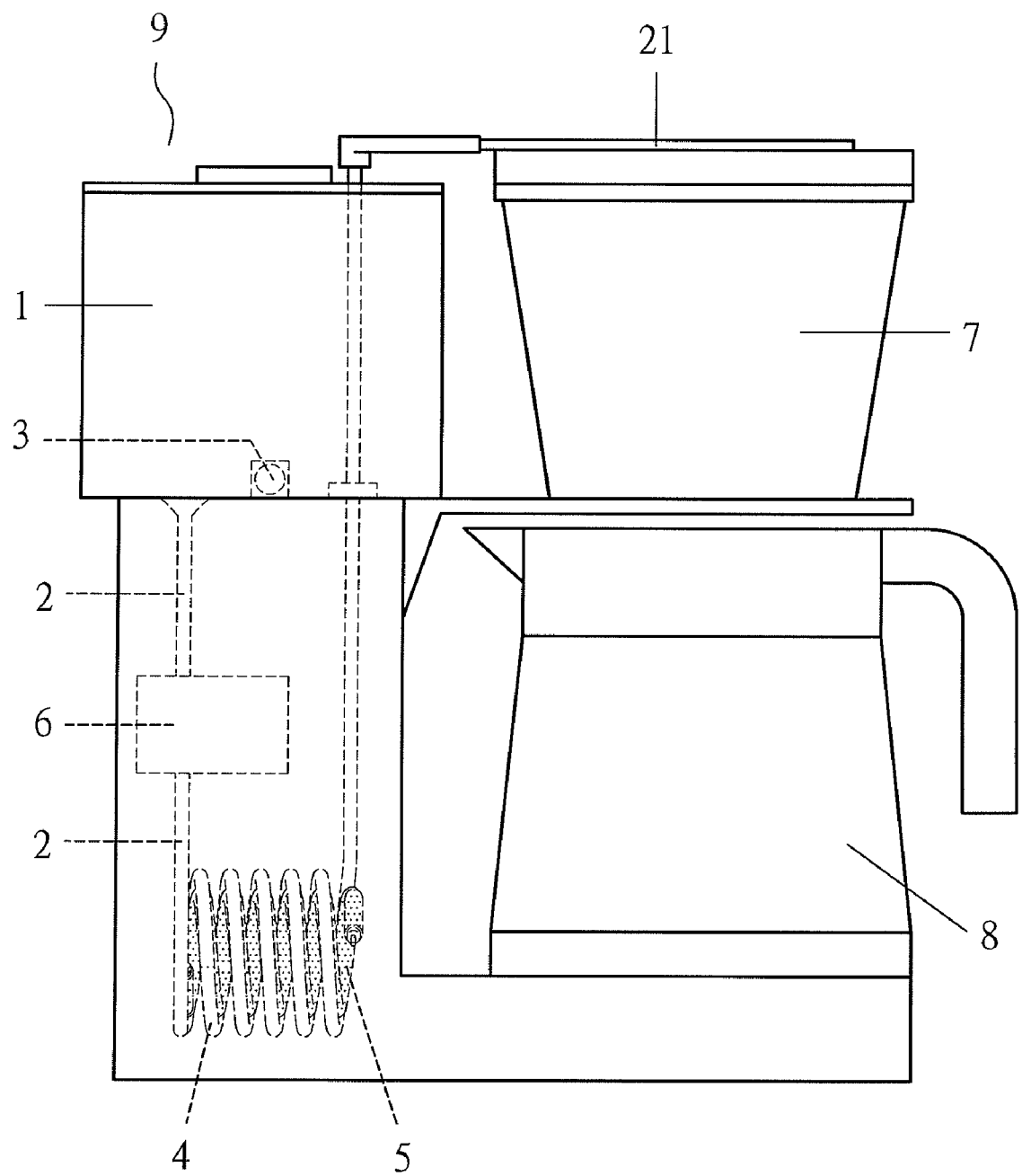
FIG. 2 schematically illustrates a water feeding and heating assembly of a hot drink maker implementing a first embodiment of the present invention.

Please refer to FIG. 2 for a water feeding device of a hot drink maker 9 according to a first embodiment of the present invention, wherein the hot drink maker 9 is designed for infusing ground coffee for example and includes a water tank 1 having a bottom extended with a water pipe 2, which in turn is coupled to a showerhead-type water outlet 21 above a brewing chamber 7. Besides, a container 8 is placed under the brewing chamber 7 for receiving brewed coffee therefrom. The water feeding device according to the present invention is characterized by the following features.

The water tank 1 of the hot drink maker 9 has an end installed with a water temperature sensor 3. A computer circuit board (not shown in the drawing) is installed at a predetermined position of the hot drink maker 9. The water pipe 2 extending from the bottom of the water tank 1 to the showerhead-type water outlet 21 above the brewing chamber 7 is formed with a tubular inner receptacle 4 having a plurality of turns. The tubular inner receptacle 4 has an inner periphery installed with an electric heating tube 5 that extends in accordance with the tubular inner receptacle 4. In addition, a motor 6 is installed at a section of the water pipe 2 between the water tank 1 and the tubular inner receptacle 4.

As shown in FIG. 2, when the hot drink maker 9 assembled from the aforementioned components is used for infusing ground coffee, the water temperature sensor 3 senses a water temperature in the water tank 1 and sends a temperature sensing result to the computer circuit board. The temperature sensing result determines a delay time by which the motor 6 is to be delayed from being started to push out heated water. The delay time depends on local atmospheric temperature (e.g., the delay time is longer where local atmospheric temperature is low, and shorter where local atmospheric temperature is high) and is the time for which the heated water shall stay in the tubular inner receptacle 4 so that even after the heated water is pushed out and reaches the showerhead-type water outlet 21, the water pushed out maintains at a predetermined temperature. Tap water in the water tank 1 flows by itself into the tubular inner receptacle 4 so as to be heated by the electric heating tube 5 to the predetermined temperature (preferably 85° C. in the present embodiment) and, after the motor 6 is delayed by the previously set delay time, is pushed by the motor 6 into an inlet of the brewing chamber 7 smoothly and completely so that ground coffee in the brewing chamber 7 is infused by the liquid-state heated water of the predetermined temperature to make a tasty hot drink.

Figure 3:
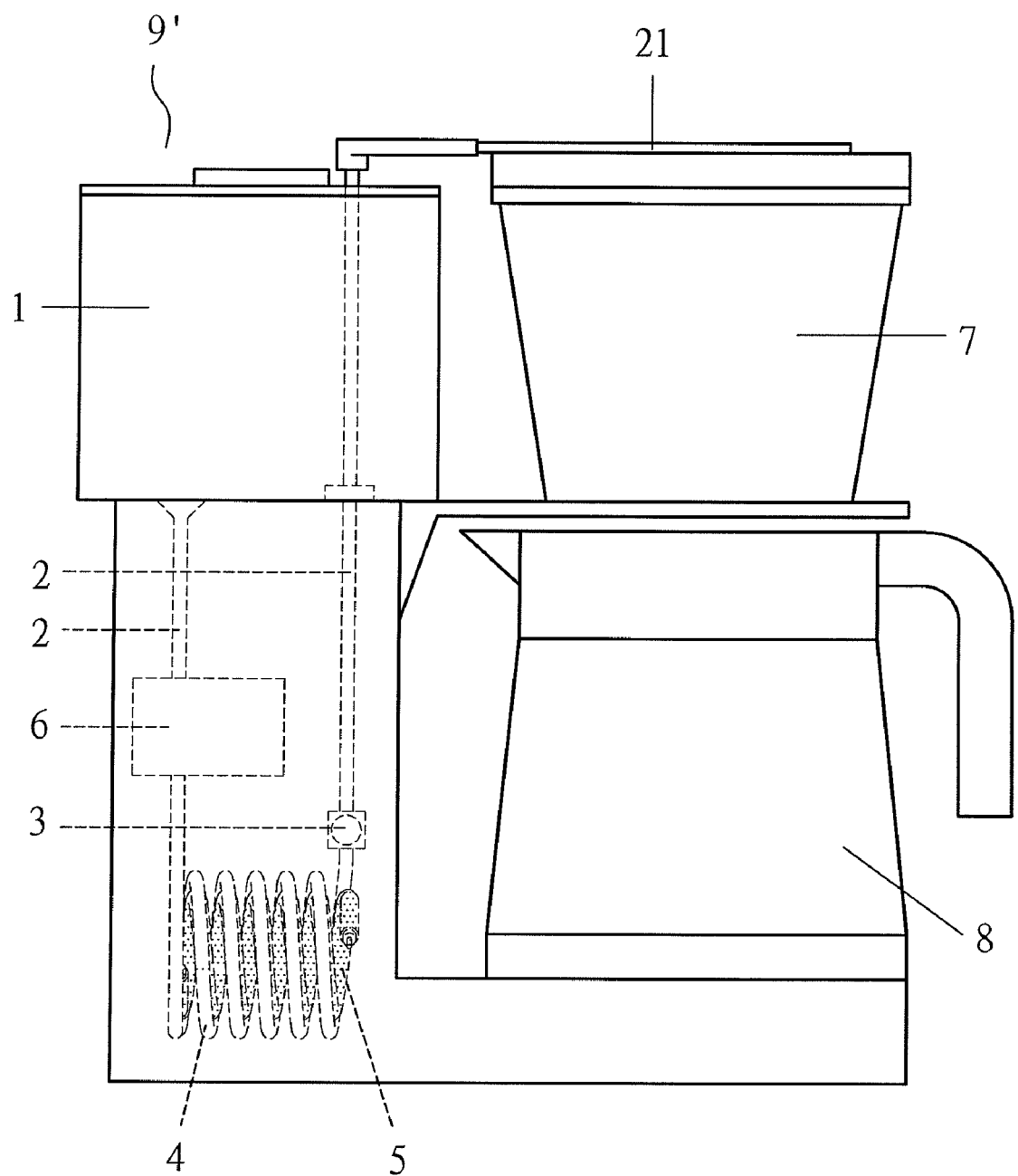
FIG. 3 schematically illustrates a water feeding and heating assembly of a hot drink maker implementing a second embodiment of the present invention.

FIG. 3 illustrates a water feeding device of a hot drink maker 9' for infusing ground coffee according to a second embodiment of the present invention. As shown in the drawing, a water tank 1 has a bottom extended with a water pipe 2 formed with a tubular inner receptacle 4 having a plurality of turns. A water temperature sensor 3 is installed adjacent to a water outlet of the tubular inner receptacle 4. A computer circuit board (not shown) is installed at a predetermined position of the hot drink maker 9'. An electric heating tube 5 is installed at an inner periphery of and extends in accordance with the tubular inner receptacle 4. Also, a motor 6 is installed at a section of the water pipe 2 between the water tank 1 and the tubular inner receptacle 4.

As shown in FIG. 3, when the hot drink maker 9' assembled from the aforementioned components is used for infusing ground coffee, the water temperature sensor 3 senses a water temperature of water heated in the tubular inner receptacle 4 and sends a sensing result to the computer circuit board where the sensing result is converted into a delay time by which the motor 6 is to be delayed from being started to push out the heated water. On the other hand, tap water in the water tank 1 flows by itself into the tubular inner receptacle 4, is heated by the electric heating tube 5 to a predetermined temperature (preferably 85° C. in the present embodiment), and, after the motor 6 is delayed by the previously set delay time, is pushed by the motor 6 smoothly and completely into an inlet of the brewing chamber 7. Thus, the liquid-state heated water of the predetermined temperature infuses ground coffee in the brewing chamber 7 to make a tasty hot drink.

Figure 4:
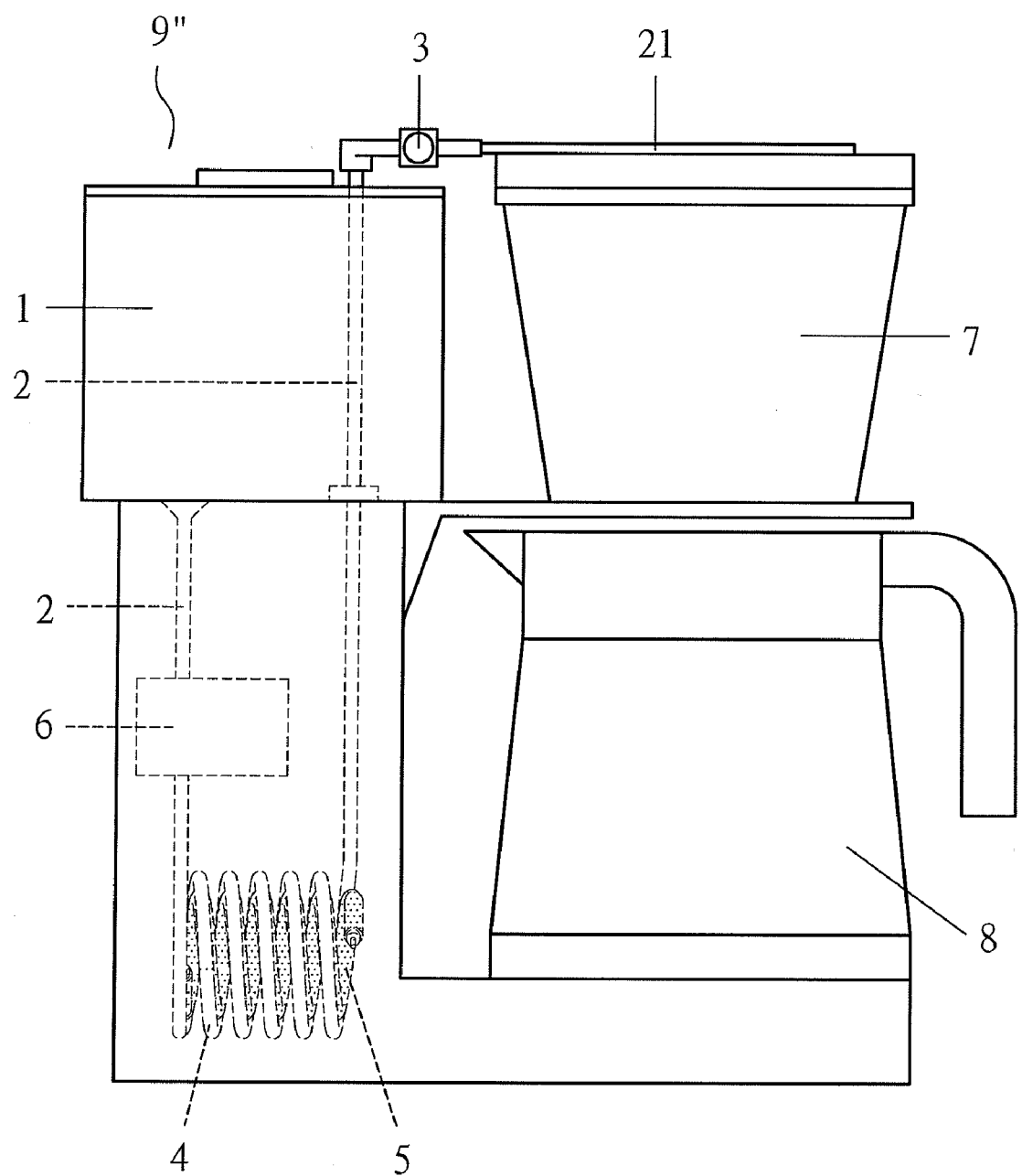
FIG. 4 schematically illustrates a water feeding and heating assembly of a hot drink maker implementing a third embodiment of the present invention.

Referring to FIG. 4 for a water feeding device of a hot drink maker 9'' for infusing ground coffee according to a third embodiment of the present invention, a water pipe 2 extends from a bottom of a water tank 1 and has a distal end coupled to a showerhead-type water outlet 21. A water temperature sensor 3 is installed adjacent to the distal end of the water pipe 2. A computer circuit board (not shown) is installed at a predetermined position of the hot drink maker 9'''. The water pipe 2 extending from the bottom of the water tank 1 is formed with a tubular inner receptacle 4 having a plurality of turns. The tubular inner receptacle 4 has an inner periphery installed with an electric heating tube 5 which extends in accordance with the tubular inner receptacle 4. Finally, a motor 6 is installed at a section of the water pipe 2 between the water tank 1 and the tubular inner receptacle 4.

As shown in FIG. 4, when the hot drink maker 9" assembled from the aforementioned components is used for infusing ground coffee, the water temperature sensor 3 senses a water temperature of water inside a section of the water pipe 2 adjacent to the showerhead-type water outlet 21 and sends a sensing result to the computer circuit board where the sensing result is converted into a delay time by which the motor 6 is to be delayed from being started to push out heated water. On the other hand, tap water in the water tank 1 flows by itself into the tubular inner receptacle 4 so as to be heated by the electric heating tube 5 to a predetermined temperature (preferably 85° C. in the present embodiment) and, after the motor 6 is delayed by the previously set delay time, is pushed by the motor 6 smoothly and completely into an inlet of the brewing chamber 7. Thus, ground coffee in the brewing chamber 7 is infused by the liquid-state heated water of the predetermined temperature to make a hot drink with a desirable taste.

The invention claimed is:

1. A water feeding device of a hot drink maker, wherein the hot drink maker is a heating device for making hot drinks and comprises a water tank having a bottom extended with a water pipe coupled to a showerhead-type water outlet above a brewing chamber, and the water pipe is installed with an electric heating tube for heating tap water, the water feeding device being characterized by comprising:
a water temperature sensor installed at an end of the water tank of the hot drink maker; a computer circuit board installed at a predetermined position of the hot drink maker; a tubular inner receptacle having a plurality of turns and formed by the water pipe extending from the bottom of the water tank to the showerhead-type water outlet above the brewing chamber, the electric heating tube being installed at an inner periphery of and extending in accordance with the tubular inner receptacle; and a motor installed at a section of the water pipe between the water tank and the tubular inner receptacle;
wherein when the hot drink maker is used for infusing ground coffee, the water temperature sensor senses a water temperature in the water tank and sends a sensing result to the computer circuit board where the sensing result is converted into a delay time by which the motor is to be delayed from being started to push out heated water, and tap water in the water tank flows by itself into the tubular inner receptacle so as to be heated by the electric heating tube to a predetermined temperature and, after the motor is delayed by the previously set delay time, is pushed by the motor into an inlet of the brewing chamber smoothly and completely so that ground coffee in the brewing chamber is infused by the liquid-state heated water of the predetermined temperature to make a hot drink with a desirable taste.

2. A water feeding device of a hot drink maker, wherein the hot drink maker is a heating device for making hot drinks and comprises a water tank having a bottom extended with a water pipe coupled to a showerhead-type water outlet above a brewing chamber, and the water pipe is installed with an electric heating tube for heating tap water, the water feeding device being characterized by comprising:
a tubular inner receptacle having a plurality of turns and formed by the water pipe extending from the bottom of the water tank of the hot drink maker; a water temperature sensor installed adjacent to a water outlet of tubular inner receptacle; a computer circuit board installed at a predetermined position of the hot drink maker, the electric heating tube being installed at an inner periphery of and extending in accordance with the tubular inner receptacle; and a motor installed at a section of the water pipe between the water tank and the tubular inner receptacle;
wherein when the hot drink maker is used for infusing ground coffee, the water temperature sensor senses a water temperature of water heated in the tubular inner receptacle and sends a sensing result to the computer circuit board where the sensing result is converted into a delay time by which the motor is to be delayed from being started to push out the heated water, and tap water in the water tank flows by itself into the tubular inner receptacle so as to be heated by the electric heating tube to a predetermined temperature and, after the motor is delayed by the previously set delay time, is pushed by the motor into an inlet of the brewing chamber smoothly and completely so that ground coffee in the brewing chamber is infused by the liquid-state heated water of the predetermined temperature to make a hot drink with a desirable taste.

3. A water feeding device of a hot drink maker, wherein the hot drink maker is a heating device for making hot drinks and comprises a water tank having a bottom extended with a water pipe coupled to a showerhead-type water outlet above a brewing chamber, and the water pipe is installed with an electric heating tube for heating tap water, the water feeding device being characterized by comprising:
a water temperature sensor installed adjacent to a distal end of the water pipe extending from the bottom of the water tank of the hot drink maker, wherein the distal end is coupled with the showerhead-type water outlet; a computer circuit board installed at a predetermined position of the hot drink maker; a tubular inner receptacle having a plurality of turns and formed by the water pipe extending from the bottom of the water tank, the electric heating tube being installed at an inner periphery of and extending in accordance with the tubular inner receptacle; and a motor installed at a section of the water pipe between the water tank and the tubular inner receptacle;
wherein when the hot drink maker is used for infusing ground coffee, the water temperature sensor senses a water temperature of water inside a section of the water pipe adjacent to the showerhead-type water outlet and sends a sensing result to the computer circuit board where the sensing result is converted into a delay time by which the motor is to be delayed from being started to push out heated water, and tap water in the water tank flows by itself into the tubular inner receptacle so as to be heated by the electric heating tube to a predetermined temperature and, after the motor is delayed by the previously set delay time, is pushed by the motor into an inlet of the brewing chamber smoothly and completely so that ground coffee in the brewing chamber is infused by the liquid-state heated water of the predetermined temperature to make a hot drink with a desirable taste.

* * * * *